Oct. 3, 1967    E. OVILLE    3,344,530
MEASURING EQUIPMENT FOR THE GEOMETRICAL CONTROL
AND/OR THE TRUING OF RAILWAY TRACKS
Filed May 19, 1965    5 Sheets-Sheet 1
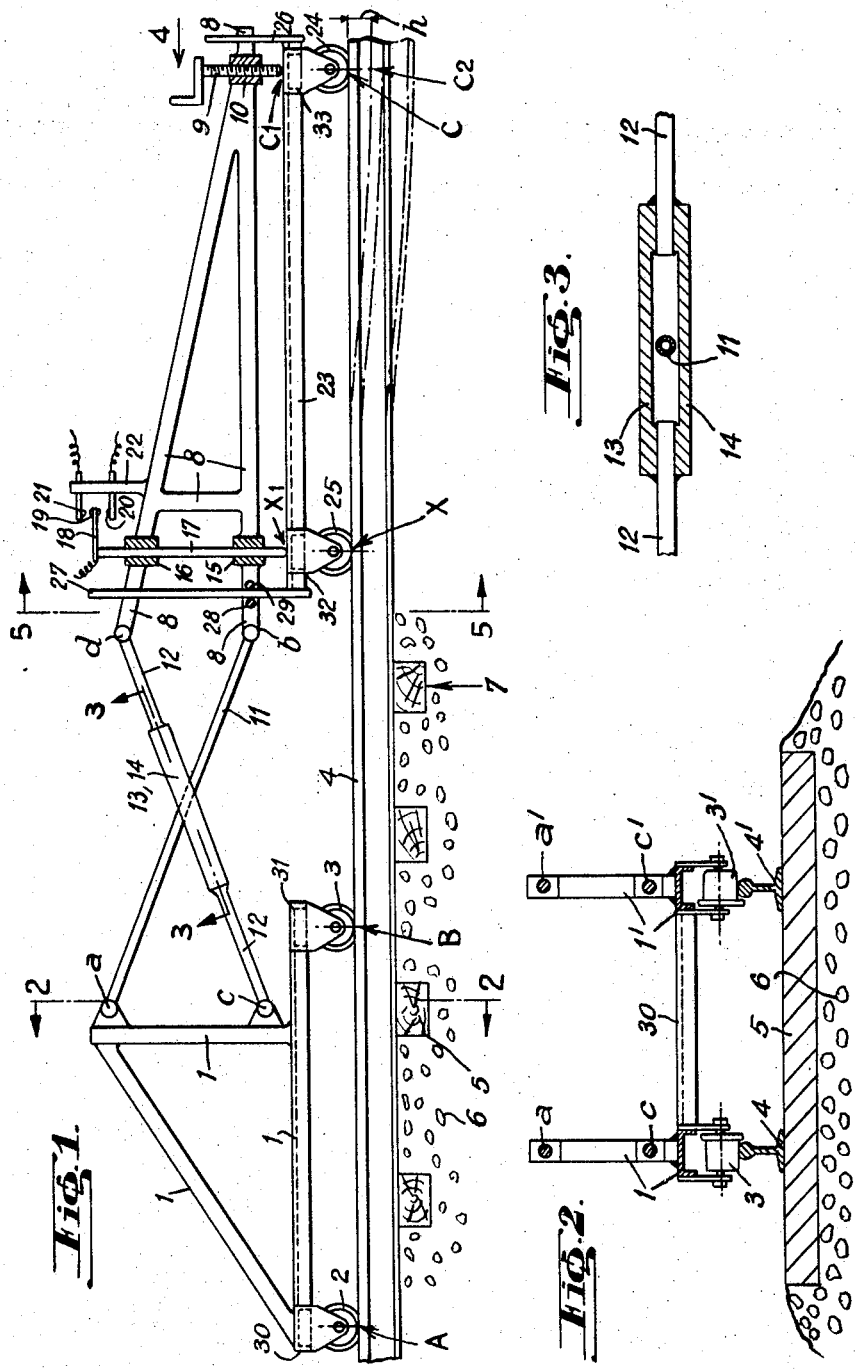

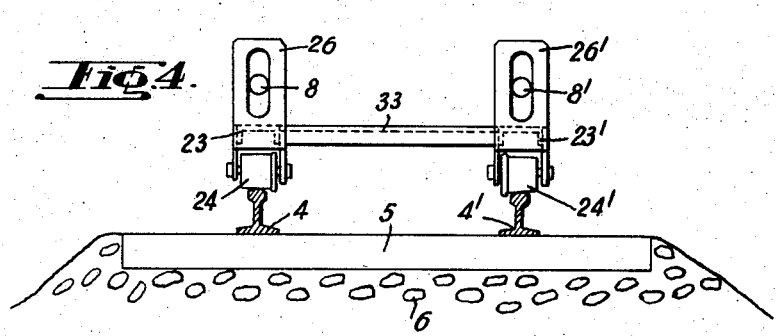
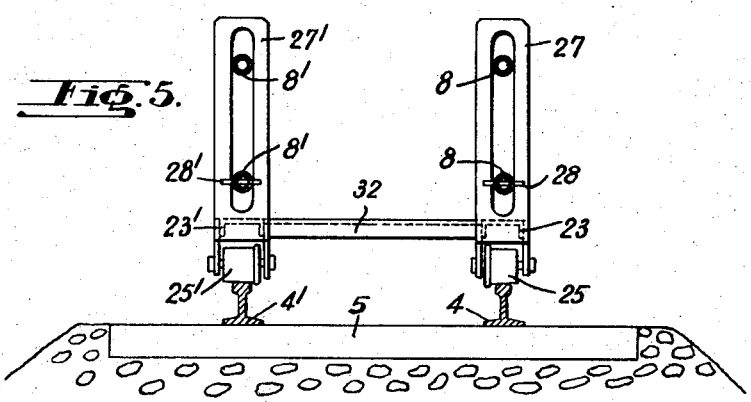
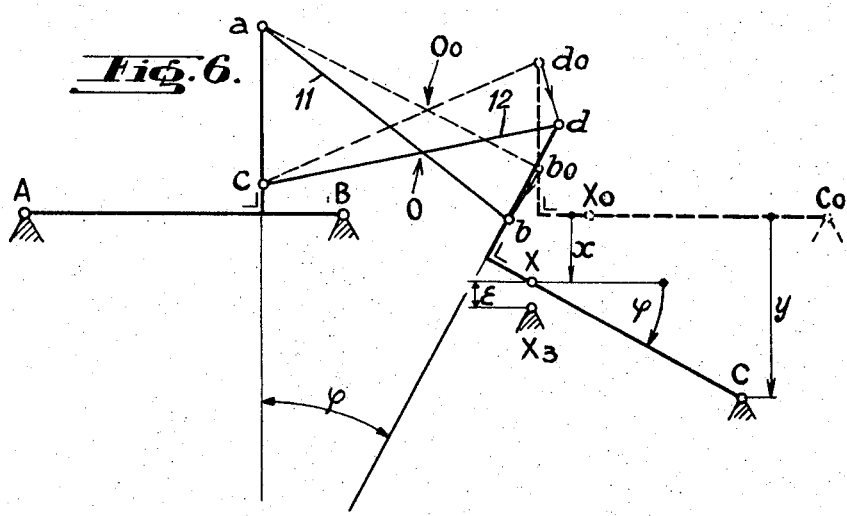

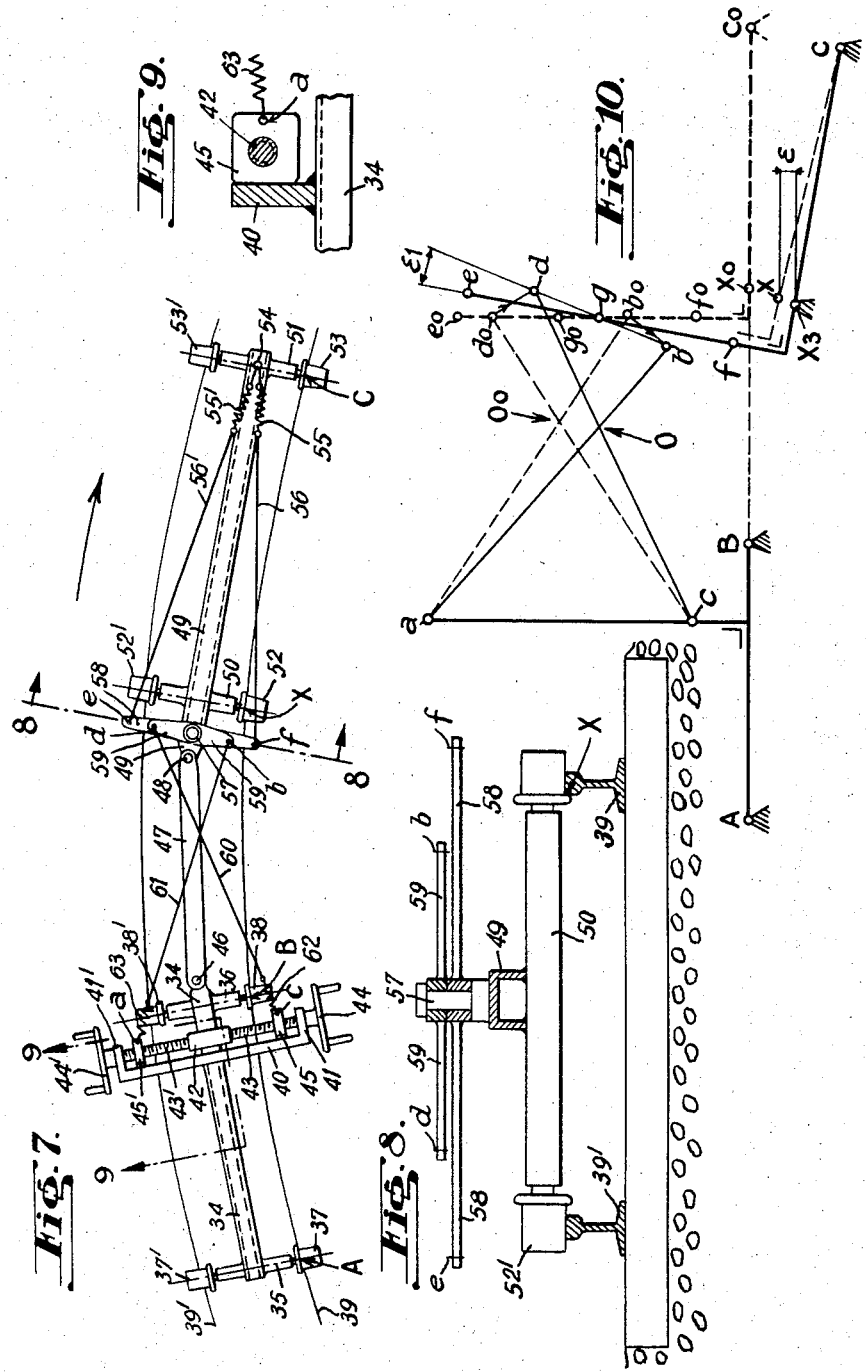

Oct. 3, 1967 E. OVILLE 3,344,530
MEASURING EQUIPMENT FOR THE GEOMETRICAL CONTROL
AND/OR THE TRUING OF RAILWAY TRACKS
Filed May 19, 1965 5 Sheets-Sheet 5

United States Patent Office 3,344,530
Patented Oct. 3, 1967

3,344,530
MEASURING EQUIPMENT FOR THE GEOMETRICAL CONTROL AND/OR THE TRUING OF RAILWAY TRACKS
Eugène Oville, Lausanne, Switzerland, assignor to Materiel Industriel S.A., Lausanne, Switzerland, a corporation of Switzerland
Filed May 19, 1965, Ser. No. 457,113
Claims priority, application Switzerland, May 20, 1964, 6,542/64
9 Claims. (Cl. 33—174)

ABSTRACT OF THE DISCLOSURE

Apparatus for the detection of geometrical irregularities in a railway track line in which the position of the track at four consecutive reference points along the track is sensed and wherein two neighboring reference points having fixed distances are related pairwise to two different reference bases respectively supported by two frames rolling on the track, which frames are coupled together by means of two coupling members fixed pivotally on said frames such that straight lines passing through the pivot points on the frames have an intersection point located between planes perpendicular to respective reference bases passing through the interior reference points such that the reference bases form a reference system for a curved track line without an inflection point, the position of the track line being determined by the geometrical arrangement of the coupling members with respect to the length of the reference bases and by the position of three of the reference points, there being provided means for detecting the deviation of one of the interior reference points from the form of the curved line and for controlling a track moving apparatus, the aforesaid intermediate reference point serving as a correction point.

---

It is of great importance to obtain extreme accuracy of the running surface of railway tracks, to permit the passage of rail traffic at high speed and under heavy axle loads. This has led to various track control apparatus which are often installed on vehicles known as automotive repair trucks or control cars.

In another connection, renewal and upkeep work has led to the development of machines which, operating along successive track sections, raise and/or shift the track sections while its position is consolidated by wedging, ramming or tamping. Levelling and straightening devices are provided which comprise measuring means either to control the movement of the section to be corrected, or to ascertain the correct position. To this end, the measuring devices have, adjacent to the said section, at least one reference point per line of rails.

Amongst the measuring systems used for truing, those, in particular, are known, which call upon a simple or multiple comparison base which circulates with the power-device causing the movement.

The invention relates to this assembly of measuring apparatus and devices which make use of such relative bases to determine a reference point, not as a function of fixed reference marks, but relative to guide-points movable with the reference point.

A first general category includes the measuring devices founded on the alignment of three points, that is to say with a rectilinear base.

Various apparatus and devices locate the reference point between the two guide-points.

In particular, in levelling and straightening, some provide the first guide-mark on the portion of the track already corrected and the second on the part to be trued.

The alignment means are optical sightings, stretched wires, luminous rays, beams or rigid frames hinged one to the other, etc.

The advantage of simplicity of alignment is in particular compensated for by the obligation of correcting during operation the position of the reference point when the curve of the rail varies, which occurs in levelling at each change of gradient and in straightening, at each junction curve. This intervention of the operator presents in addition to the complication in the working of the machine, risks of mistakes harmful to the final accuracy, costly and sometimes impossible alterations, etc.

Another method proposed for levelling consists in basing oneself on a single guide-point located on the good portion of the track and several guide-points chosen on the track in front of the reference point. The raising height is determined by the rear point and the highest of the front points by means of angles formed between the various segments. This device thus also presents the above mentioned defects.

Such is also the case with another method proposed for levelling and straightening, and which is based on guide-points exclusively located on the portion of the track already trued.

A second category of relative measurement devices includes those which use two or more movable bases.

The last cited method is known, but in its improved variant for levelling which provides in addition to a first base resting entirely on the correct portion of the track, a second base resting entirely on the portion to be trued, with, if need be, the possibility of proportioning the reciprocal influence of these two bases on the reference point.

It will be noted that this last method admits as being correct the position of the three guide-points in order to determine the reference point. In a curve, this means composing a section of track into an arc passing through these three points, the shape of the arc being modified by the mentioned proportioning. It is the well-known concept of a curvature circle in geometry, or again the parabola arc currently used, for example, for straightening.

In this last category, there is also known a method of straightening which, in order to determine an arc of a circle, is based on the comparison of two sags. In order to avoid the difficulties of production and use of a geometrical chord of great length between outer guide-marks as is required by this method, it has been proposed to divide it into several contiguous chords and to measure each angle at the apices in order to determine the total sag. In practice, this method results in complications and inaccuracies which increase with the number of dimensions measured.

It is therefore desirable to provide a system coming under the second cited category and which permits the avoiding of the use of too large a base, or of bases which overlap or are arranged side by side, or which require several measurements, in particular dimension angles of low values, etc.

This is the object of the present invention, which provides a measuring equipment for the geometrical control and/or the truing of railway tracks, of the type including two measuring devices extending along the track and bearing thereon, the first at two guide-points and the second at one guide-point.

The equipment according to the invention is characterized in that it comprises means for maintaining these devices at a distance one from the other and one in front of the other, and a deformable mechanism for connecting two separate points of one of these devices to two separate points of the other device, so that the relative position of two elements of the assembly indicates automatically the error in the position of a fourth guide-point of the second device relative to a desired geometrical condition of the rail on the section of track included between the end guide-points.

The accompanying drawing shows diagrammatically and by way of examples, several embodiments of the equipment according to the invention.

FIGURE 1 is a side view of a first embodiment according to the invention suitable for levelling.

FIGURE 2 is a section along line 2—2 of FIG. 1.

FIGURE 3 is a partial section along line 3—3 of FIG. 1.

FIG. 4 is an end view in the direction of arrow 4 of FIG. 1.

FIGURE 5 is a section along line 5—5 of FIG. 1.

FIGURE 6 is an explanatory diagram relating to the operation of the device of FIG. 1.

FIGURE 7 is a plan view of a second embodiment applicable in the case of straightening.

FIGURE 8 is a section along line 8—8 of FIG. 7.

FIGURE 9 is a section along line 9—9 of FIG. 7.

FIGURE 10 is an explanatory diagram of the operation of the device of FIG. 7.

Figure 11:
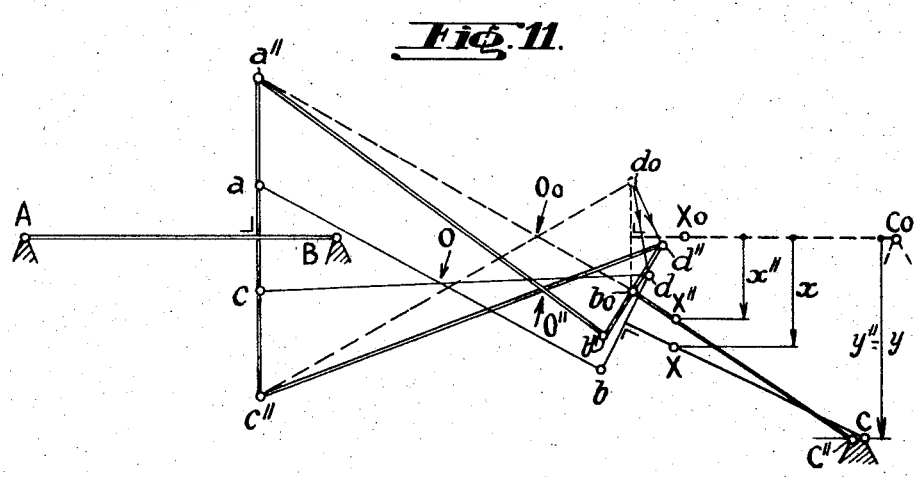
FIGURE 11 is an explanatory view of a variant of the device of FIG. 1.

In FIG. 1 there is shown a first measuring device constituted by a rigid frame-work 1 in the shape of a triangle which bears, through the wheels 2 and 3, on points A and B of a rail 4 secured to the sleepers 5 resting on the ballast 6. Points A and B are guide-points for this first device and determine a measuring base. This base is straight above rail 4 and is entirely located on the already levelled portion of the track which extends further forward up to the point 7 where its position is consolidated by wedging or ramming.

On the portion of the track to be trued, in front of point 7, is also disposed straight above 4 a second measuring device formed by a triangular-shaped rigid frame 8 and which bears at point $C_1$ on a truck 23, 24, 25, through the agency of a vertical screw 9 engaged in a nut 10 secured in frame 8.

The two devices 1 and 8 are interconnected on the one hand by a bar 11 hinged at its two ends, at $a$ on 1 and at $b$ on 8, and on the other hand by a bar 12 also hinged at the two ends, at $c$ on 1 and at $d$ on 8. This bar 12 is divided into two over a part at its length by the elements 13 and 14 soldered laterally at 12 to permit the free passage of bar 11 between them, as is more clearly seen in FIG. 3.

In FIG. 1 there is further seen that the lower and upper bearing members of frame 8 are traversed by two guides 15 and 16, which allow a rod 17 of square cross section to slide freely, while being prevented from rotating.

Rod 17 is supported at $X_1$ by its lower rounded portion resting on the truck 23, 24, 25. At the top of 17 is fixed a flexible bar 18 carrying an electrical contact 19 housed between two other contacts, a lower one 20 and an upper one 21, integral with a support 22 fixed on frame 8.

The truck or auxiliary frame formed by beams 23 supported by wheels 24 and 25, rests on the rails at points C and X, located below $C_1$ and $X_1$ respectively. Points C and X are guide-points for a second measuring base.

On the front and on the rear of beam 23 are mounted two guiding plates 26 and 27 engaging the frame 8 in slots thereof (FIGS. 4, 5) to permit relative vertical movement of frame 8 so that the latter is always maintained freely in the plane of the rail.

The rear plate 27 passes with sufficient play between two horizontal pins 28 and 29 which pass through the lower member of the frame 8.

During levelling (the case shown), the two devices 1 and 8 as well as the two bars 11 and 12 are straight above the line 4 of rails. In this plane, the rear base is stable since it rests on two points A and B, and the front base is also stable since it bears indirectly on C and is prevented from pivoting about $C_1$ due to the bars 11 and 12.

On the other of the rails, there is provided a second apparatus identical to the one which has just been described and which is thus hidden in the drawing.

The member corresponding to that of the first apparatus will be marked by the same number to which is added the sign ('). The two beams of 1 and 1' are interconnected by U-shaped members 30 and 31 which, by their elasticity, permit the four wheels 2, 3, 2' and 3' always to remain in contact with the rails 4 and 4', under the action of the weight of the device.

To the same end, the beams 23 and 23' of the auxiliary frame are connected by U-shaped members 32 and 33 which permit permanent contact between 24, 25, 24' and 25' and the track, under the action of the weight of the auxiliary frames and trucks.

FIG. 2 shows the rear connecting member 30. Thus each of the devices 1 and 1' is forced to remain in the plane of its line of rails.

In FIGS. 4 and 5, the elements of FIG. 1 are reproduced in the same manner. These two drawings show the guiding of frames 8 and 8' in their respective plane.

FIG. 6 is designed to show what happens when the track instead of being straight, has a certain curvature. This diagram, which reproduces with the same designations certain of the elements cited, will be examined in more detail during the description of the operation which follows.

Due to the precautions taken, in particular flexible connections, guiding and hinges, each of the units provided for each line of rails operates independently of the other, so that their operation is identical in any alignment or curvature.

In the position shown in FIG. 1, points A, B, C and X are in line. The screw 9 is adjusted so that its end point $C_1$ has a distance from C which is equal to $X-X_1$. The movable contact 19 is separated from 20 and 21; no current passes through them.

The joints $a$ and $c$ are vertically disposed relative to the line AB and the joints $b$ and $d$ are vertically disposed with respect to the straight line CX.

The bar 11 joining $a$ to $b$ and the bar 12 connecting $c$ to $d$ are of the same length and inclined to the same extent.

If now for some reason the feeling point X moves away from the line AB, for example rises, the rod 17 rises, and the flexible blade 18 causes the movable contact 19 to bear against 21 through which then passes an electric current. If on the contrary this feeling point X falls, the rod remains supported by the lower contact which is then traversed by the current. The position of X may thus be determined by the energized contact which may act on an automatic control causing for example the raising of the track section. This kind of control referred to as an "all or nothing" control may, in a modified form, be replaced by a "continuous" control.

In levelling, the track must generally be raised, the rail initially having the form shown in dot and dash lines in FIG. 1. The contact point $C_2$ is then lower than C and the auxiliary truck is inclined forwardly. But $$X_1-X=C_2-C$$

and the frame 8 recovers its original level position. This all takes place as if the said device was continuing to bear on the point C in line with AB.

When the length profile of the track curves in or bulges out, for example for a change in gradient, the assembly still bears on the guide-points A, B, and C which are no longer in line. If the feeling point X is in the correct position, it coincides with the reference point determined by the device, that is to say by the neutral position of the contact 19 and by the mechanism formed by the two devices and the rods 11 and 12.

This latter case is shown in FIG. 6 where there has been traced in full lines the relative positions of these members by schematically showing the rear base by the segment (AB) and its perpendicular (ac), and the front base by the straight line (CX) and its perpendicular (bd). For convenience, the whole figure has been pivoted so as to bring (AB) to the horizontal position. The diagram is completed by broken lines which show the aligned position of the device and the sign "0" has been given to the points corresponding to C, X, b and d.

It will be seen that C has moved away by the amount y from the line AB, which at the same time has brought the slope $\varphi$ of CX on AB and the alignment spacing x from the point X. Thus for any value of y corresponds a well determined value of x.

It is to be noted here that, for the clearness of this diagram and of all those which follow, the transverse movements x and y have been greatly exaggerated in reality are much smaller relative to the other distances such as (AB), (BX), (XC), etc. The relative horizontal movements of C and X are thus in fact practically negligible.

The judicious choice of the transmission mechanism and of the proportions permits of fixing at will a definite arc, for example a circle, parabola, etc. passing through the four points A, B, C and X, which is a great advantage of the device according to the invention over known systems, which are based on the properties of a single arc, for example of a circle.

This transmission mechanism must fulfill the following conditions:

(1) It must permit the alignment of the four points A, B, C and X.

(2) It must permit the transverse movements on either side of this alignment position, movements imparted by C.

(3) It must maintain regular the curvature of the track between A and C, imposed by the point B, that is to say that the arc AC must not present any inflection point.

This last condition may be replaced by the observation that the geometrical site of the instantaneous centers of rotation of one of the bases A–B relative to the other C–X remains constantly located in the spacing of track between B and X, this within the extreme limits permitted for the angles formed between the two bases, or again between the maximum alignment spacings of C.

In FIG. 6, the relative instantaneous center of rotation is at the intersecting point of 11 and 12, that is to say at O, and at $O_0$ for the alignment position.

In order best to take into account the irregularities of the track, or again that during truing, the point B which is admitted to be correct—is not influenced by the raising or the shifting carried out adjacent X, it is necessary that the distance between these points B and X be sufficient.

In another connection, it is particularly advantageous to place ac at right angles with AB and bd at right angles with XC, or in their vicinity. Thereby there is obtained the important advantage of not requiring a rigid base AC, which adapts readily to the greatest track curvatures with a minimum of transverse clearance. This advantage is particularly important in the straightening of low guage tracks.

These practical reasons establish the importance in locating the said geometrical site in the spacing included between the two bases.

Another important advantage is that the mechanism may be provided at a height which is convenient for the constructor in order to avoid possible obstacles due for example to the machine which carries out the truing.

In FIG. 6, $X_3$ designates a feeling point which is too low. The error $e$ will be indicated by the feeler X and may be corrected as previously seen. Thus, due to the double transmission, a single measurement is sufficient to estimate a defect. This is an important advantage, in particular from the points of view of accuracy and simplicity, as compared to most of the known systems of this category which require two measurements, one serving generally to control a servo-motor.

In variants not shown, the feeler may actuate an indicating apparatus, a recorder, etc., for the control of the track; the front base may be partly relieved of its weight, for example by a counter-weight disposed on the auxiliary frame; this latter may be the chassis of the machine effecting the truing work.

It will be seen that the rigid bars 11 and 12 constitute a deformable mechanism connecting two separate points $a, c$ of a first measuring device 1, to two separate points $b, d$ of a second measuring device 8. The first of these devices, 1, bears on the track at two guide-points A, B, while the second, 8, bears on the track at a guide-point X. The bars 11 and 12 serve also, in this example, to hold these measuring devices at a distance one from the other and one in front of the other.

The described connection by means of the bars 11, 12, hinged on the two measuring devices, has as a consequence that, the guide-points A, B, C are "good" points of the track, the second device being forced to assume a position, relative to the first, such that two points of the second device (for example the contact 18 and the member 22, FIG. 1) themselves assume a relative position indicating automatically the error in the position of the fourth guide-point X relative to a desired geometrical condition of the rail on the track section included between the end guide-points A and C. This desired geometrical condition may be an arc of a circle, an arc of a parabola, or an arc of any other curve, chosen in advance and on which are found the points A, B, C, whereas X moves away. In the case of the geometrical control of the track, this motion has been merely observed as described up to the present. In variants which will be described hereafter this motion will be measured. When proceeding with the truing of the track, it is necessary to bring X on to the chosen arc of the curve, that is to say to reduce the above mentioned spacing to zero.

In order to abbreviate the description, it is noted that the equipment is of symmetrical construction relative to the middle plane of the track and only one-half of the construction will be described in detail, the other half being of the same construction and designated where necessary by the same numerals as the described half but with primed members.

In FIG. 7 there is shown a first device including a single U-shaped axial member 34, secured at its ends to two tubes 35 and 36 having pivot axles for wheels 37 and 37', and 38 and 38', each resting on lines of rails 39 and 39'. A transverse member 40 is welded to member on 34 and is bent at each end to form two bearings 41 in which may pivot a screw 42 with two opposed threads 43 and 43'. Axially, screw 42 is held by the two end cranks 44 and 44', in abutment with the said bearings 41. Each of the threads is in engagement with a nut 45, 45' prevented from turning by the member 40 against which it bears lightly. FIG. 9 shows this enlarged detail.

Member 34 is prolonged forwardly to be hinged at 46 to a draw-bar 47, itself hinged at 48 on a U-shaped axial member 49 of a second truck. Member 49 is welded to two tubes 50 and 51 each traversed by an axle the wheels of which 52 and 52', or 53 and 53' are supported by the rails 39, 39'.

On member 49 at right angles with tube 51 is fixed a lug 54 connected to springs 55, 55', in turn connected to two wires 56, 56' arranged in V formation in a substantially horizontal plane.

On member 49, and between tube 50 and hinge 48, is welded a vertical shaft 57 which permits the free (and independent) pivoting of two superposed levers 58 and 59 (FIG. 8). The wires 56 and 56' are secured at the points, $f$, $e$ at the two ends of lever 58. At the end points $d$ and $b$ of the lever 59 are secured wires 60, 61, fixed to the points $c$, $a$ of the nuts 45, 45', through the agency of tension springs 62, 63.

The elements 60, 62 and 61, 63 constitute a deformable mechanism connecting two separate points $a$, $c$ of the first measuring device, to two separate points $b$, $d$ of the second, to impose on the second device a well defined relative position, as a function of the position of the points A, B, C. The draw bar 47 ensures the maintenance of the two measuring devices at a distance one from the other.

The deformable mechanism presents a symmetrical configuration when the guide-point X is in the correct position.

The operation is as follows:

In the position shown, the flanges of the wheels 37, 38, 52 and 53 bear against the inner side of the rail head 39 at the guide-points A and B, X and C, through the agency of normal elastic means (not shown). The said rail is assumed to be in the correct position and the two levers 58 and 59 coincide angularly under the action of the wires fixed thereto.

In fact, the springs 55 and 55' have been chosen to be identical so as to produce the same tension in wires 56 and 56'; thus the triangle of $e$-$f$-54 is made rigid whatever the deformations (elastic) of the front truck, admittedly very long. Similarly, the springs 62 and 63 produce the same tension in the wires 60 and 61 so that the distance $ab$ is always equal to the distance $cd$ in spite of the change of distance between the bases.

From what has been stated in the case of the first device, it is seen (FIG. 10) that the operation of this straightening device corresponds to the diagram FIG. 6 when the track is in the correct position, in alignment or in a curve.

If on the other hand, the track is defective at the point $X_3$, the device assumes the position schematically shown in FIG. 10. The error is expressed by an angular spacing $\epsilon_1$, between the perpendiculars $(bd)$ and $(ef)$ indicated by the angular deviation of the levers 59, 58. The correction of the error causes the movement of the front base, which is not the case in the first example.

It is stressed that the two embodiments may be used for the control of the track in a plane and in profile, in straightening and in levelling. Practically, the second embodiment offers advantages in the simplicity of execution and greater accuracy as a result of the small value of the dimensions to be measured in comparison with the necessary large spans between the points A, B, X and C.

The role of the screw 42 with opposed threads is to be able to vary the distance $(ac)$ while preserving the symmetry of the device.

In the embodiment according to FIGS. 7 to 10, it is therefore the angular spacing between the levers 58 and 59 which indicates the measurement of the divergence or error of position of point X relative to the desired geometrical condition of the rail.

In FIG. 11, there has been reproduced the diagram of FIG. 6, but with the bases (AB) and (XC) passing between the perpendiculars $(ac)$ and $(bd)$ so as to show more clearly the said symmetry. There is shown an enlargement of $(ac)$ to (a "$c$") and there is traced in broken lines the new position of the members so that C" is moved away by the same amount $y$ from the line AB. It will be seen that the correct point X of the first adjustment has moved to X" after adjustment. Thus there is eliminated a means for proportioning the relative influence of the front and rear bases on the position of the adjusted point, that is to say for modifying at will the form (chosen) of the arc passing through ABC and this regulation point.

This proportioning presents a first advantage for example when leaving a levelling or straightening working site, according as to whether the track to be trued is more or less good, as is well known.

Another advantage exists in the straightening of inclined curves. The weight itself of the track tends to return the latter towards the inside of the curve at the moment of shifting; it is therefore preferred to voluntarily overshoot the theoretical point to compensate for this effect combined with the elasticity of the track.

The proportioning mechanism described, with single control, may—in variants not shown—be equipped with a proportioning indicator, actuated by a motor, or located externally disposed on the front device, and sensitive to the variation of distance between bases, etc. It may be adapted to all the arrangements considered in the present description. This proportioning device offers a means of adjusting at will the position of at least one of the above mentioned separate points $a$, $b$ on the corresponding measuring device, in order to modify the desired geometrical condition of the rail according to circumstances.

Figure 12:
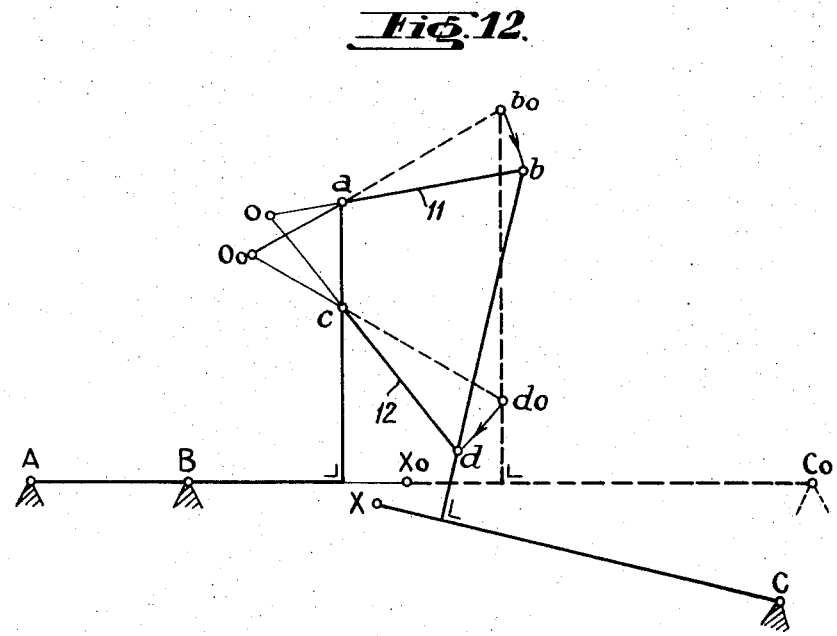
FIGURES 12 to 14 are three similar diagrammatic views showing the operation of three other variants.
Figure 13:
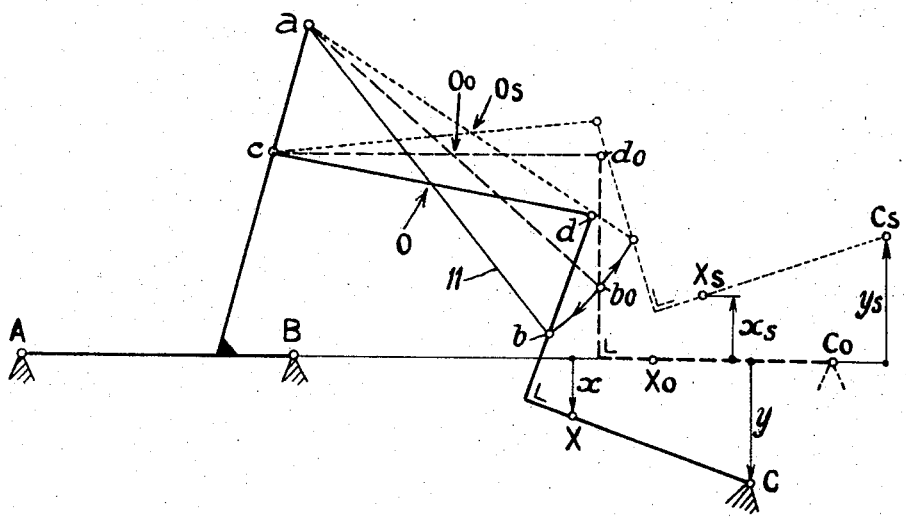
Figure 14:
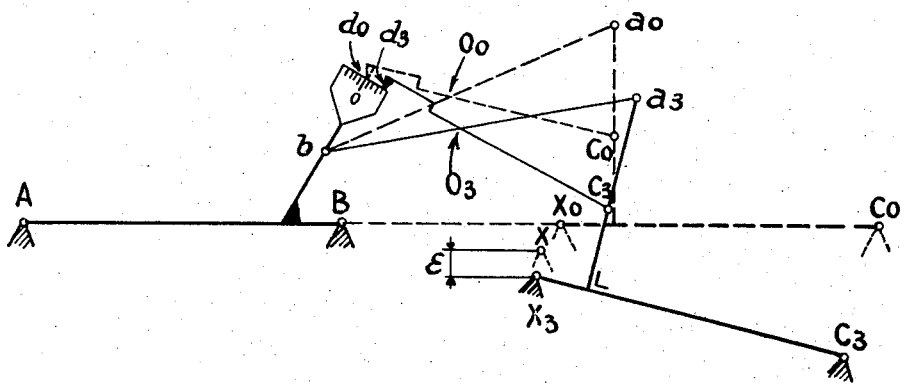

FIGS. 12 to 14 show several variants and their operation. Herein again are shown with their previous designations, the essential points which, from what has been previously described, clearly show the various elements and explain their operation. There will therefore only be indicated hereafter a few important particularities of these variants.

FIG. 12 shows that the rods—extensible or not—may have a converging point outside the space between the two bases provided that this instantaneous relative center of rotation remains in the space included between B and X.

FIG. 13 shows, on the one hand, that the straight line $(ac)$ need not necessarily be perpendicular to $(AB)$, and on the other hand that it is not indispensable that the transmission be symmetrical in the mean position. Taking into account the mentioned low transverse clearances, it is possible with judicious selection to find a very great variety of mechanisms satisfying the cited conditions, but which enjoy advantageous properties. In the diagram, there is shown in dotted lines the position corresponding to $C_s$ placed at $y_s=y$ and it can be seen that $x_s$ is slightly different from $x$. One may for example profit from this asymmetry, for example in levelling, in order to encourage the raising of the track at the passage of the high points.

FIG. 14 shows the front base bearing on a defective point $X_3$, of error $\epsilon$. The diagram shows that the point $d_3$ has moved from $d_0$ by sliding on a diagrammatic indicator integral with the rear base. It is seen that even in this incorrect position, the instantaneous relative center of rotation complies with the condition fixed above.

Within the scope of the invention, many other variants may be considered. Thus, one may provide pulleys instead of levers (which visibly gives identical results in view of the low end transverse clearance), or again cam, reverse, gear mechanisms, etc., according to the possible arrangement.

What I claim is:

1. Apparatus for the detection of geometrical irregularities in a railway track, said apparatus comprising means for sensing the position of the track at four consecutive reference points along the track and including first and second frames rollable on the track supporting a respective pair of neighboring spaced sensing devices corresponding to the reference points, said devices being supported on the frames at fixed distances and defining respective reference bases, coupling means for said frames including two coupling members each having opposite ends, pivots connecting the coupling members at their ends to the first and second frames such that straight lines passing through the pivots on the frames have an intersection point located between planes perpendicular to the respective reference bases at the reference points thereof closer to the reference points of the other base, whereby the reference bases form a reference system for a curved track line without an inflection point, the position of said track line being determined by the geometrical arrangement of the coupling members with respect to the length of the reference bases and by the position of three of the said reference points, and means for detecting the deviation of one of the interior reference points from the form of the curved line and for controlling a track moving apparatus, said intermediate reference point serving as a correction point.

2. Apparatus according to claim 1, wherein the coupling members are rigid bars.

3. Apparatus according to claim 1, wherein the coupling members are flexible elements, the coupling means further comprising a draw bar connecting the frames and maintaining the flexible elements under tension.

4. Apparatus according to claim 1, wherein the correction point is arranged slidably on the frame of the corresponding reference base, said means for detecting deviation including means for indicating the movement of said correction point with respect to the associated frame as a measure of the deviation of the correction point with respect to the curve line.

5. Apparatus according to claim 1, wherein both reference bases are rigidly coupled to their corresponding frames, one of said frames including a lever pivotally connected thereto, said lever supporting said pivots and being connected to the coupling members, said lever undergoing angular movement with respect to the associated frame in correspondence with the deviation of the correction point from the curve line.

6. Apparatus according to claim 1, wherein an end of one of the coupling members is slidably mounted on one of the frames to undergo sliding movement with respect to the frame in correspondence with the deviation of the correction point from the curve line.

7. Apparatus according to claim 1, wherein said sensing devices of both frames are wheels for rolling on the track, the contact points of the wheels on the track constituting the reference points.

8. Apparatus according to claim 1, further comprising an adjusting device on one of the frames for adjusting the positions of the reference points so as to select the characteristic of the curve line.

9. Apparatus for the detection of geometrical irregularities in the rails of a railway track, said apparatus comprising first and second frames, a pair of wheels for each frame rollable on a respective rail of the track and constituting reference points at the points of contact with the track rail, said reference points being arranged in succession, neighboring pairs of points being associated with a respective frame and defining respective reference bases, a lever pivotally mounted on one of the frames, coupling means between the lever and the other of the frames, said coupling means including a pair of coupling members connected to said lever and the other of said frames and extending along respective lines which cross between planes perpendicular to the respective reference bases at the reference points thereof closer to the reference points of the other base whereby the reference bases form a reference system for a curved track line without an inflection point, the position of the track line being determined by the geometrical arrangement of the coupling members with respect to the length of the reference bases and by the position of three of the said reference points, and means for detecting the deviation of one of the interior reference points of said pairs from the form of the curved line and for controlling a track moving apparatus, said intermediate reference point serving as a correction point, said wheels and thereby the reference bases being rigidly coupled to their corresponding frames, said lever which is pivotally mounted on said one frame, undergoing an angular movement with respect to the latter frame corresponding to deviation of the correction point from the curve line, and adjusting means on the other of said frames for adjusting the geometrical arrangement of the reference system so as to select the characteristic of the curve line.

References Cited

UNITED STATES PATENTS

| | | | |
|---|---|---|---|
| 1,769,521 | 7/1930 | Lamb | 33—174 |
| 2,507,896 | 5/1950 | Frank | 33—144 |
| 2,814,119 | 11/1957 | Grossmann | 33—144 |
| 2,859,528 | 11/1958 | Grossmann | 33—144 |
| 3,263,332 | 8/1966 | Plasser et al. | 33—180 |

SAMUEL S. MATTHEWS, *Primary Examiner.*